United States Patent

Bigliano et al.

[15] 3,668,311

[45] June 6, 1972

[54] METHOD AND SYSTEM FOR SIMULATING HALFTONES

[72] Inventors: Robert Paul Bigliano; Karl Lehman Thaxton, both of Wilmington, Del.

[73] Assignee: E. I. du Pont de Nemours and Company, Wilmington, Del.

[22] Filed: Nov. 19, 1969

[21] Appl. No.: 878,161

[52] U.S. Cl. ....................178/6.7 R, 96/45
[51] Int. Cl. ....................H04n 5/84
[58] Field of Search ....................178/6.7, 6.6 B; 96/45, 46

[56] References Cited

UNITED STATES PATENTS 3,197,558 7/1965 Ernst ....................178/6.6 B

*Primary Examiner*—Robert L. Griffin
*Assistant Examiner*—Donald E. Stout
*Attorney*—James T. Corle

[57] ABSTRACT

A halftone screen process is electronically simulated to obtain exposure conditions for main and flash and/or bump exposures with different halftone screens and photographic films.

24 Claims, 6 Drawing Figures

METHOD AND SYSTEM FOR SIMULATING HALFTONES

BACKGROUND OF THE INVENTION

This invention pertains to a simple graphic arts method and system for making corrected halftones, and more particularly tone-corrected halftones, from continuous tone separation transparencies.

Prior to this invention a halftone print was made from a continuous tone separation transparency by exposing the image from the continuous tone transparency on a photographic film through a halftone screen thereby reproducing the image as fine dots with the darker regions consisting of large area dots and the lighter regions consisting of smaller area dots. The determination of the exposure conditions to produce an accurate reproduction of the continuous tone image in halftone form was dependent upon the operator's skill based upon previous experience and intuition. Often an expensive and time consuming trial and error photographic copying and hand retouching operation to produce a reasonably accurate but artistically derived halftone and lithographic plate for printing followed by proofing is required. In many cases, one shade of the continuous tone image would be satisfactorily reproduced in the halftone while other shades of the same image were unsatisfactorily reproduced.

For making black and white halftones to be used in black and white (or one color) printing, attempts have been made to make a halftone which satisfactorily reproduces all shades in the continuous tone image. These attempts utilize three different exposures on the photographic film; main, flash and bump exposures; however, determination of the exposure conditions for each exposure required a highly trained and experienced operator who could only base his judgment on his intuitive and artistic ability. The main exposure involves projecting the continuous tone image onto the radiation sensitive layer of the photographic film through a halftone screen in contact with the film whereby individual dot image areas are produced having a large percent dot area in dark regions and small percent dot areas in light regions. The term "percent dot area" is defined as area covered by dots relative to total area.

The flash exposure involves exposing the photographic film with the halftone screen to uniform non-image light resulting in a large growth of percent dot area of small dots, intermediate growth of medium sized dots, and small growth of large dots. Thus, the lighter regions can be darkened while the darker regions appear to remain the same since the flash exposure has a greater proportional effect on the small dots than the large dots. For example, a small percent dot area of 5 percent may be doubled during a flash exposure giving a 5 percent increase in dot area whereas a large percent dot area of 90 percent is only slightly affected by the flash exposure.

The bump exposure is accomplished by projecting the continuous tone image onto the photographic film without using the halftone screen. The bump exposure increases the large dots created by the main exposure with little effect on the smaller dots thereby increasing the contrast of the halftone.

In addition to the above exposures, flare exposure must be considered by the operator in the halftone process. The term "flare exposure" refers to all non-image light which reaches the film plane of the camera being used in the halftone process and has the same effect on the halftones as the flash exposure and, thus the operator must compensate for flare exposure by reducing the amount of flash exposure. Flare light is a result of, for example, spurious external light, light reflected off the bellows of the camera, light diffused by the camera lens, and light diffused by the photographic film. Where spurious external light has been minimized, the amount of flare light varies with the average light transmission of the continuous tone separation transparency, the type of camera used in the halftone process and the optical characteristics of the lens used.

Many difficulties are experienced in adapting main, flash and bump exposures to color printing, and only for a few simple color applications is such a feat attempted and then only by highly trained operators specializing in color work. A halftone must be made for each continuous tone separation transparency of a color picture. The size of the halftone dots not only affects the darkness of the halftone image but also the hue of the resultant color print. Since color operation is so complex and expensive, most commercial operations only use the main exposure and rely upon the intuition and artistic skills of the operator in developing the halftone and in producing lithographic printing plates. The deficiencies and expense of such systems are major problems in the printing industry.

Color correction systems for halftone processes are known in the art. Rose in U.S. Pat. No. 2,872,508 discloses a system for producing color corrected halftones from continuous tone positive or negative transparencies utilizing an overall function of transmittance values without specifically simulating the photomechanical process. Such prior art systems require complex and often inaccurate calibration procedures by the operator and are only operable with a particular halftone screen and photographic film combination and do not accurately simulate the effect of the halftone screen. The operator of such systems still must rely upon his artistic skills in film development to compensate for errors in exposure caused by the inaccurate calibrations and the deficiencies of such systems.

SUMMARY OF THE INVENTION

The graphic arts method and system of this invention enables tone-corrected halftones to be produced without requiring proofing or without requiring a highly skilled operator or requiring the operator to rely upon his intuition or artistic skill. A continuous tone separation transparency made from a subject is scanned by a flying spot scanner to produce signals proportional to the light transmittance of the transparency. The signals proportional to the light transmittance of the transparency are amplified by an electronic simulation system to produce signals proportional to the percent dot area of the main alone or the main and flash and/or bump exposures on a photographic film. The electronic simulation system can be adjusted to simulate different exposure conditions for the main exposure alone or the main and flash and/or bump exposures wherein the exposure conditions are directly obtainable from the electronic simulation system and can be calibrated, as will be discussed below, to different photographic film and halftone screen combinations. The percent dot area signals are displayed on a picture tube thereby producing a picture similar to the halftone that would be produced with the exposure conditions established in the electronic simulation system on the particular photographic film using a particular halftone screen. An operator can visually compare the displayed picture with the subject and adjust the electronic simulation system to obtain a displayed picture which coincides with the subject to obtain exposure conditions. The exposure conditions can then be transposed from the electronic simulation system to a halftone camera, and a halftone is made from the continuous tone transparency using the exposure conditions to produce a tone-corrected halftone. Printing plates can be made by using the tone-corrected halftones without requiring etching of the plates or other correction techniques relying upon the artistic skill of the operator except when errors in color correction exist in the separator transparency, or intentional local color changes from the original are desired. Required color correction techniques are known to one skilled in the art.

Tone-corrected halftones for color printing are made by producing continuous tone separation transparencies, producing a signal proportional to the light transmittance for each transparency, modifying each transmittance signal to produce percent dot area signals for each transparency, displaying the combined percent dot area signals of all the transparencies on a color picture tube, adjusting the main and flash and/or bump exposures on the electronic simulation system for each separation transparency to obtain a display which coincides with the color subject, and transposing the exposure values to the camera to produce halftones for each separation transparency.

For producing tone-corrected halftones from some continuous tone separation transparencies, only the main exposure will be required. Other continuous tone transparencies may require main exposure as well as flash and/or bump exposures to make a more precisely tone-corrected halftone.

The method of electronic simulation of the halftone process comprises producing a transmission signal proportional to the light transmission of a continuous tone transparency; modifying the transmission to produce a signal representative of the main exposure on a photographic film; and non-linearly amplifying the signal representative of the main exposure to obtain a signal proportional to the percent dot area of the main exposure.

The method of electronic simulation of the halftone process having main and flash exposures comprises the following steps:

1. producing a transmission signal proportional to the light transmission of a continuous tone transparency;
2. modifying the transmission signal to produce a signal representative of the effect of main exposure on a photographic film;
3. summing a flash signal with the transmission signal during modification of the transmission signal wherein the flash signal is representative of the effect of the flash exposure on the photographic film and wherein the flash signal is obtained by
   a. producing a flash signal proportional to the intensity of the flash exposure light, and
   b. modifying the flash signal to produce a signal representative of the effect of the flash exposure on the photographic film; and
4. non-linearly amplifying the signal representative of the main and flash exposures to obtain a signal proportional to the percent dot area of the main and flash exposures.

The bump exposure can be simulated by non-linearly amplifying a signal proportional to the transmission signal to obtain a signal proportional to the increase in percent dot area resulting from the bump exposure. The bump exposure signal proportional to the increase in percent dot area can then be summed with the signal proportional to the percent dot area of the main or main and flash exposures to obtain a signal proportional to the percent dot area of the main or main and flash plus bump exposures.

The effect of the bump exposure on the percent dot area can be approximated by non-linearly amplifying the signal representative of the main and flash exposures to obtain a signal approximately proportional to the increase in percent dot area resulting from the bump exposure.

The effect of the average camera flare exposure on the photographic film is similar to the effect of the flash exposure and can be simulated by integrating the transmission signal to obtain an averaged transmission signal; amplifying the averaged transmission signal to produce a flare signal which is proportional to the flare exposure and accommodates the type of camera and the optical characteristics of its lens; and summing the flare signal with the amplified flash signal to be processed in the same manner as the amplified flash signal.

Suitable photographic films for making the continuous tone transparencies including color separation transparencies are those having light-sensitive silver halide layers. The layers should be sensitive to the color of the exposure light, e.g., panchromatic silver halide layers on a transparent film support are suitable. Such layers contain sensitizing dyes so that they are sensitive in the blue, green and red regions of the spectrum. The photographic films used in making halftones as described are also silver halide films and generally are orthochromatic. Under some conditions blue-sensitive or panchromatic films can be used.

The halftone camera can be a camera or projector for making halftones from the continuous tone transparency.

The term "amplifying" is defined for purposes of this invention as including attenuation and amplification by both linear and non-linear means as well as increasing or decreasing a signal by the addition of an external signal. The term "representative" is defined for purposes of this invention as being proportional either directly or after a mathematical operation has been performed on the signal such as converting the signal from logarithmic form to its corresponding antilogarithmic form.

DETAILED DESCRIPTION OF THE DRAWINGS

Figure 1:
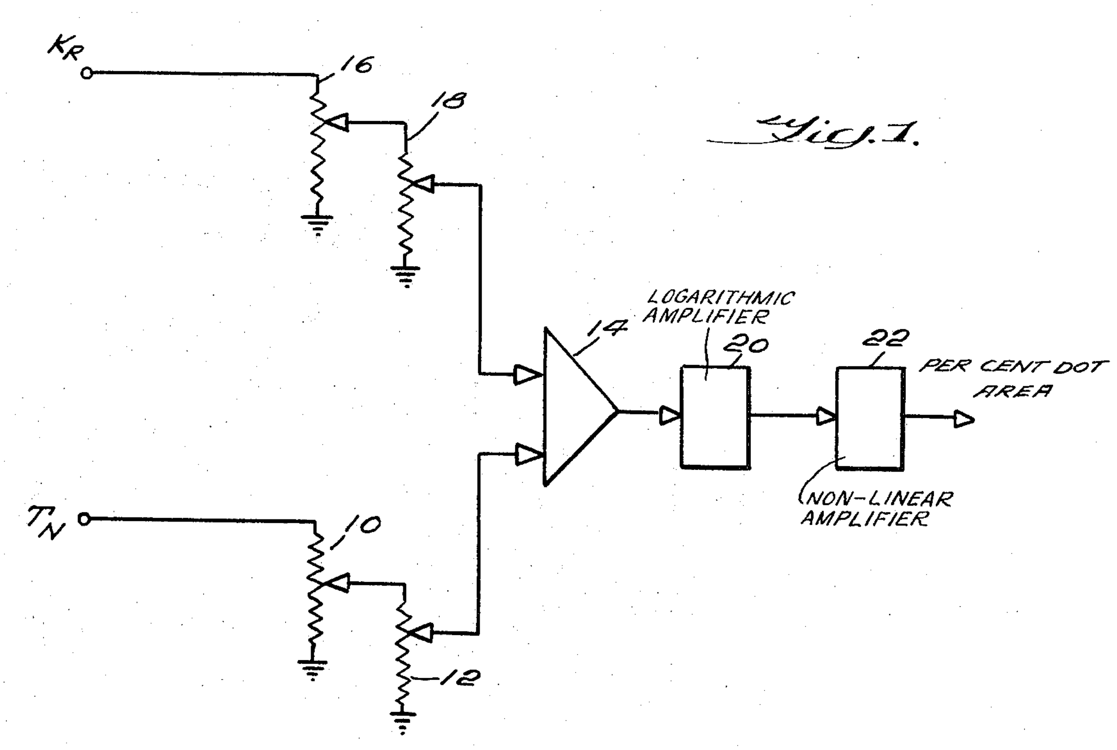
FIG. 1 is a block diagram of an electronic simulation system of the main exposure and flash exposure in a halftone screen process having calibration means to simulate particular halftone screen and photographic film combinations and independent adjustment means to simulate exposure conditions.

With reference to FIG. 1, a transmission signal $T_N$, which is a voltage proportional to the light transmission of a continuous tone separation transparency, is produced by any conventional means, for example, by a flying spot scanner, and is then modified to produce a signal proportional to the effect of the main and flash exposures. A preferred method of modifying the transmission signal is to attenuate the transmission signal to produce a signal proportional to the main exposure, sum the main exposure signal with an amplified flash signal, and logarithmically amplify the summed exposure signals to obtain a signal representative of the effects of the main and flash exposures on a particular photographic film.

The transmission signal is attenuated in two steps. First, the transmission signal is processed by main exposure calibration voltage divider 10 to attenuate the signal to simulate the effect of main exposure upon a particular halftone screen and photographic film combination. The main exposure calibration setting is determined, as will be discussed below, as a result of an empirical photographic standardization test conducted previously with a particular screen-film combination. The transmission signal is further attenuated in main exposure adjustment voltage divider 12 to determine the effect of main exposure in the halftone screen process. The main exposure adjustment voltage divider is graduated into exposure settings to be used with a halftone camera. The term "exposure" refers to the latent image effect on a photographic film and is dependent upon lens aperture and period of time the shutter is open. Such settings are based on prior empirical photographic standardization tests. The twice attenuated transmission signal is proportional to the effect of the main exposure on the photographic film.

The twice attenuated transmission signal is summed in main-flash operational summation amplifier 14 with an amplified flash signal which is proportional to the effect of the flash exposure on the photographic film. The amplified flash signal is obtained by producing a signal proportional to the intensity of the flash exposure $K_R$, which is a fixed voltage proportional to the intensity of the flash exposure light source. The flash intensity signal is attenuated in two steps by means of calibration voltage divider 16 and flash exposure adjustment voltage divider 18 which perform analogous functions to the main exposure calibration voltage divider and main exposure adjustment voltage divider, respectively.

The summation signal of the main and flash signals is then logarithmically amplified in main-flash logarithmic amplifier 20 thereby producing a signal which is proportional to the logarithm of the main and flash exposures and thus representative of the main and flash exposures.

It is obvious to one skilled in the art that many changes in circuitry can be made without departing from the teaching of this invention. For example, by non-linearly amplifying the transmission signal to obtain a signal proportional to the logarithm of the main exposure and then summing a signal representative of the effect of the flash exposure with the non-linearly amplified transmission signal, a signal can be obtained which is representative of the main and flash exposures. Another method of amplification to obtain a signal representative of the main and flash exposure is to logarithmically amplify the transmission signal and to sum a variable external signal with the transmission signal thereby increasing or decreasing the logarithm of the transmission signal to obtain a signal proportional to the logarithm of the main exposure.

Upon obtaining a signal representative of the main and flash exposures, the signal is non-linearly amplified to obtain a signal proportional to the percent dot area resulting from the main and flash exposures. In the specific embodiment of FIG. 1, the signal emitted from the main-flash logarithmic amplifier 20 is processed in adjustable screen-film non-linear amplifier 22. Adjustable non-linear amplifiers are known in the art. Examples of adjustable non-linear amplifiers operable with this invention are diode function generators such as are conventionally employed in analog computers. The non-linear relationship between the logarithm of the exposure time and the percent dot area resulting from that exposure is established by empirical photographic standardization for a particular halftone screen. The non-linear amplifier, after being adjusted to the particular halftone screen, produces a percent dot area signal proportional to the percent dot area resulting from the main and flash exposures on the photographic film.

Figure 2:
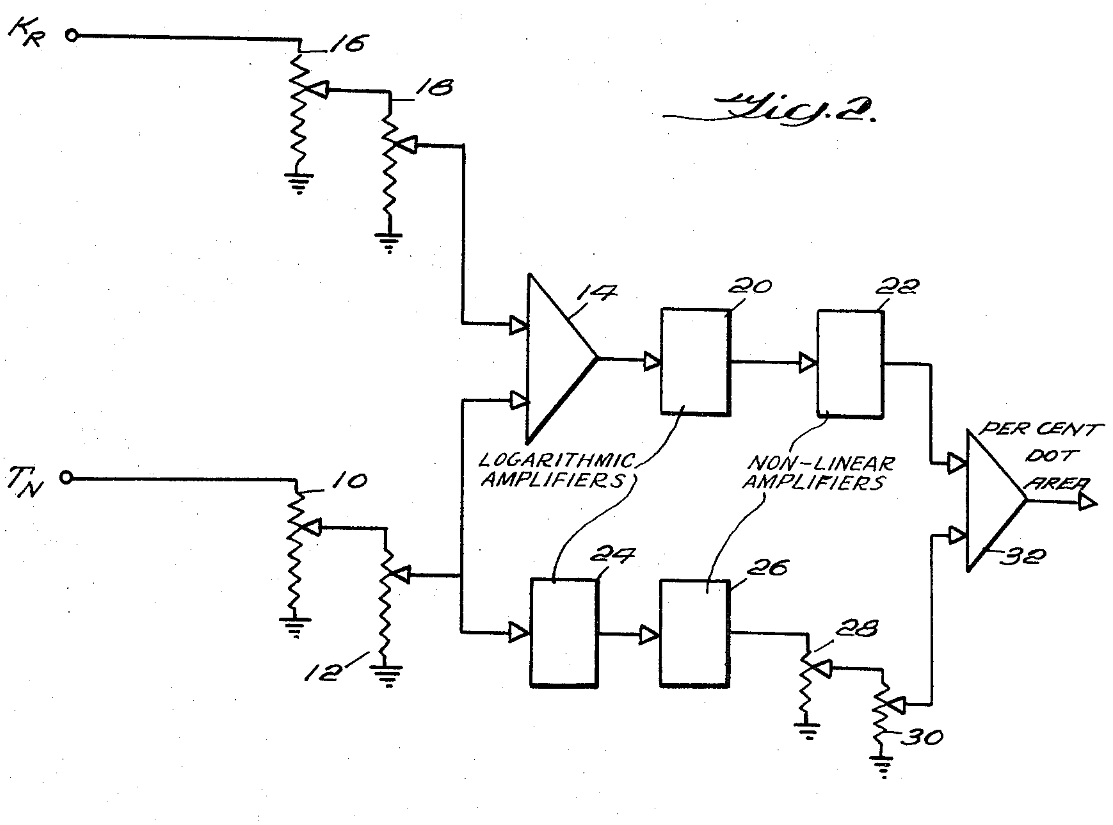
FIG. 2 is a modification of the electronic simulation system of FIG. 1 having a bump exposure simulation module.

FIG. 2 shows an electronic simulation system of FIG. 1 having a bump exposure simulation module. In this module a signal proportional to the transmission signal is non-linearly amplified to produce a signal proportional to the increase in percent dot area resulting from the bump exposure. The twice attenuated transmission signal emitted from main exposure adjustment voltage divider 12 is processed in bump exposure logarithmic amplifier 24 to be in a form usable in dot growth non-linear amplifier 26. An example of a dot growth non-linear amplifier operable with this invention is a diode function generator. The dot growth signal is attenuated in two steps, first by bump exposure calibration voltage divider 28 to simulate the effect of the bump exposure on the particular photographic film and then by bump exposure adjustment voltage divider 30 to simulate the bump exposure for bump exposure conditions in terms of percent of main exposure. It has been found that the function of the dot growth non-linear amplifier can be approximated by the use of a threshold level control and voltage divider, another form of a non-linear amplifier. The signal proportional to the increase in percent dot area is summed with the percent dot area signal of the main and flash exposures emitted from the adjustable screen-film non-linear amplifier 22 in dot summation amplifier 32 to obtain a percent dot area signal of the main, flash and bump exposures.

Figure 3:
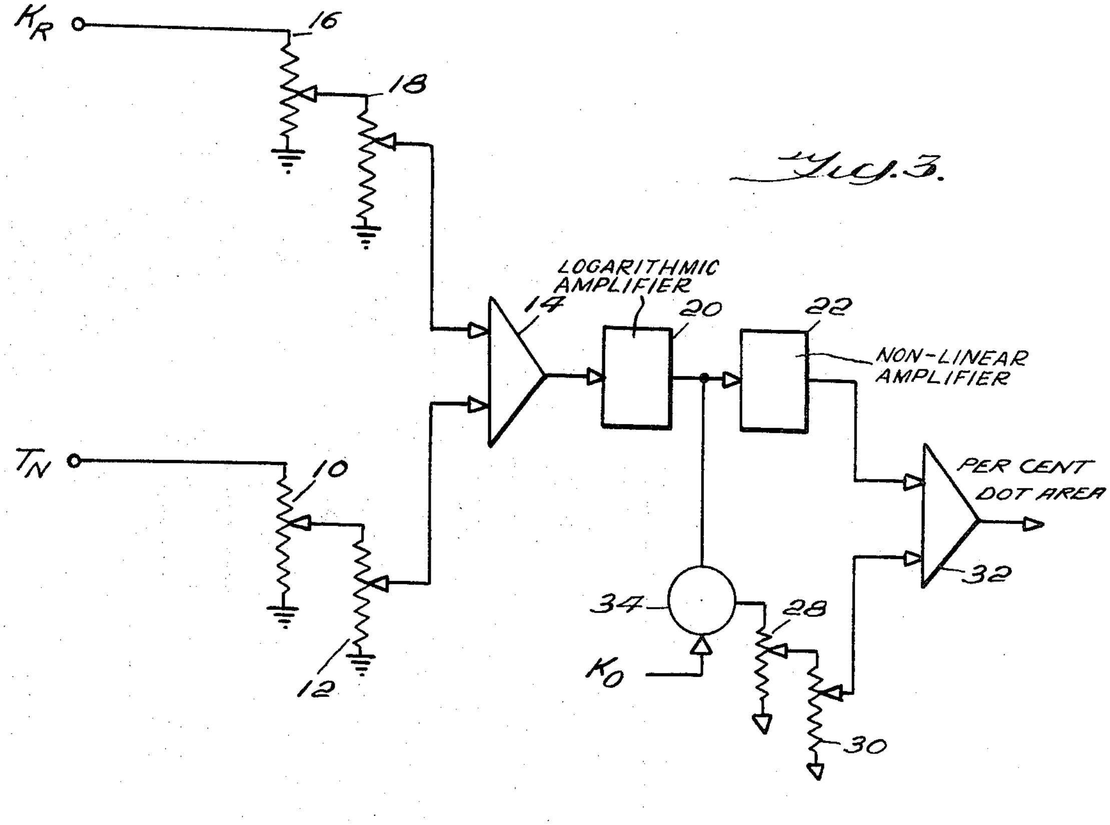
FIG. 3 illustrates an electronic simulation system of a halftone screen process of FIG. 1 including a means for approximating the bump exposure.

FIG. 3 is a modification of the electronic simulation system of FIG. 1 having an approximation bump exposure module. It has been found that the bump exposure can be approximated as a function of the main-flash logarithmic summation signal when small flash and bump exposures are required. The main-flash logarithmic summation signal emitted from main-flash logarithmic amplifier 20 is non-linearly amplified by bump exposure proportional offset 34 which establishes a threshold level for the incoming signal to reach before being processed in the bump exposure module. The threshold level is established by introducing constant voltage $K_0$ which cancels signals under the threshold level. The constant voltage $K_0$ is determined by measurements made with prior photographic standardization tests. The signal proportional to the approximate increase in percent dot area is attenuated and summed in the same manner as the increase in dot area signal in FIG. 2 to obtain an approximate percent dot area for main, flash, and bump exposures.

Whether he is using his intuition or the electronic simulator of the present invention, the halftone cameraman must first calibrate his halftone camera for the particular contact screen he is using. Such calibration is well known to those skilled in the art of halftone photography (see, for example, *The Contact Screen Story*, distributed by the Photo Products Department of the E. I. du Pont de Nemours and Company, Inc.), but will be described below because it is analogous to the procedure used to calibrate the electronic simulator of the present invention.

To calibrate his halftone camera, the photographer must make three separate calibrations relating to main, flash and bump exposures. Main exposure calibration is accomplished by first placing a piece of unexposed film on the vacuum back of the halftone camera and covering it with the contact screen. A continuous tone gray scale is then placed on the camera copy board, so that the film can be illuminated through the gray scale and contact screen, and a series of exposures is made to find the exposure time required to place a 95 percent dot (5 percent printing) pattern in the exposed area corresponding to the first step of the gray scale. This exposure time, known as "unity main exposure" is recorded, and each main exposure that the halftone photographer uses is expressed as some fraction or multiple of unity main exposure. Flash exposure calibration is accomplished by exposing a piece of film to a flash of light through the contact screen. The exposure time required to produce barely perceptible dots on the film (normally referred to as a 5 percent dot pattern) is designated as 100 percent basic flash and the amount of flash exposure used in the halftone process is expressed as some fraction of the 100 percent basic flash. Finally, bump calibration is accomplished by exposing a film which has already been exposed to unity main exposure to an additional exposure (through the gray scale but not the contact screen) equivalent to some arbitrary percentage, normally about 5 percent, of unity main exposure. This has the effect of compressing the resultant halftone gray scale so that a step on that scale which would normally exhibit less than a 95 percent dot pattern after unity main exposure will exhibit a 95 percent dot pattern after both unity main and the bump exposure. The cameraman will then know how much scale compression his 5 percent bump exposure will yield.

The electronic simulator merely replaces the halftone cameraman's intuition and skill in determining how much main, flash and bump exposure to use in each instance. He merely adjusts the main, flash and bump settings on the electronic simulator to produce an acceptable video picture, and if the electronic simulator has been properly calibrated in terms of unity main exposure, 100 percent flash exposure and 5 percent bump exposure, he can produce a halftone picture identical with that on the video screen by using the indicated main, flash and bump exposures needed to produce the acceptable video picture.

Calibration of the electronic simulator is completely analogous to the calibration of the halftone camera that has already been accomplished. To calibrate the main exposure dial on the electronic simulator, the operator merely places the continuous tone gray scale in the instrument so that a halftone video picture of the gray scale appears on the video screen. The dial associated with voltage divider 12 is then set at an arbitrary setting labeled "unity main exposure" and voltage divider 10 is adjusted until the portion of the video screen corresponding to the first step in the halftone gray scale exhibits a 95 percent dot pattern. This condition can be confirmed by direct measurement of the dot pattern on the video screen, by visual comparison of the video picture with a halftone photograph of the gray scale produced at unity exposure on the already calibrated halftone camera, or electronically, if greater accuracy is required. If the gray scale were a linear scale, the adjustment of voltage divider 10 to the point where a 95 percent dot pattern appeared in the first step of the halftone scale on the video screen would be sufficient to reproduce the entire scale. The gray scale, however, is non-linear so that a further adjustment is necessary. The complete gray scale can be reproduced on the video screen by the simultaneous adjustment of voltage divider 10 and adjustable non-linear amplifier 22 until the correct step pattern is produced.

Flash exposure calibration is achieved in the same manner. The dial associated with voltage divider 18 is set at an arbitrary position labeled 100 percent basic flash, and without a continuous tone gray scale in the instrument, voltage divider 16 is adjusted until a 5 percent dot pattern is visible on the video screen. Similarly, bump exposure calibration is accomplished by placing a continuous tone gray scale in the instrument, setting the dial associated with voltage divider 30 to 5 percent, setting the main exposure to unity and flash exposure to 0, and then adjusting voltage divider 28 until the halftone gray scale on the video screen is compressed to the extent achieved by a 5 percent bump on the halftone camera.

In essence, then, the operator calibrates all the exposure setting on the electronic simulator in the same way that he calibrates his halftone camera, but instead of varying his exposure time to produce a halftone gray scale with the proper dot pattern, he merely adjusts the indicated calibration voltage dividers to achieve the same purpose. In each case, after setting the dials of the electronic simulator to the conventional set points known to the halftone cameraman, i.e., unity main exposure, 100 percent flash exposure, and 5 percent bump exposure, calibration of the electronic simulator is accomplished by adjusting the calibration settings to reproduce on the video screen the dot pattern produced by the halftone camera using such settings. This can be done visually but, if more accuracy is required, it can be also done electronically by measuring percentages of the voltage required in each case to completely blacken the video screen, i.e., a 5 percent dot pattern would be produced by 5 percent of the voltage required to blacken the screen.

Figure 4:
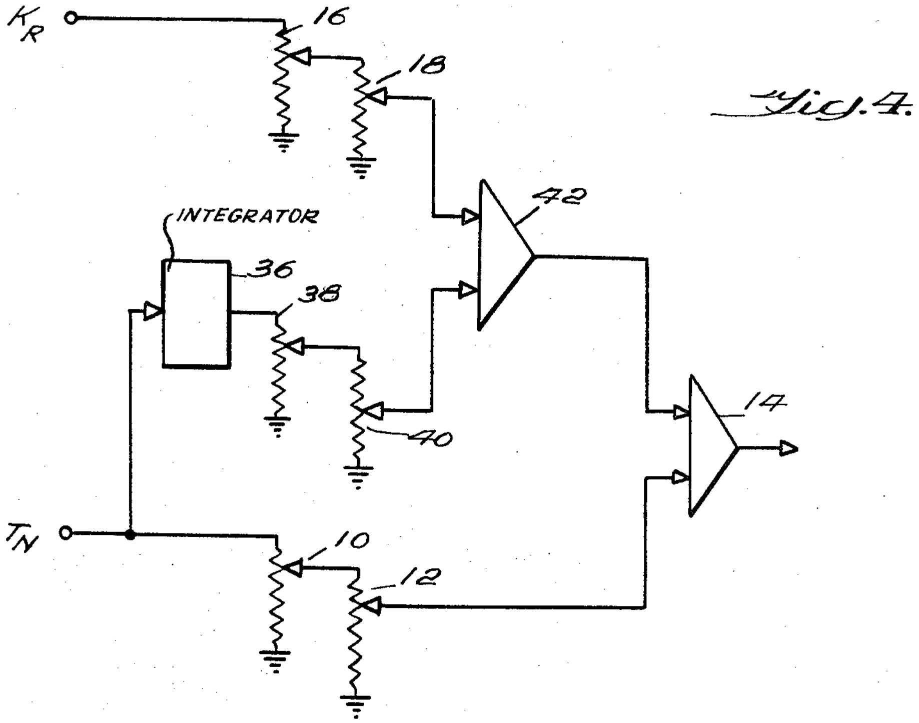
FIG. 4 is a segment of the block diagram of the electronic simulation system described in the above drawings and illustrates the use of an average camera flare exposure simulation module.
Figure 5:
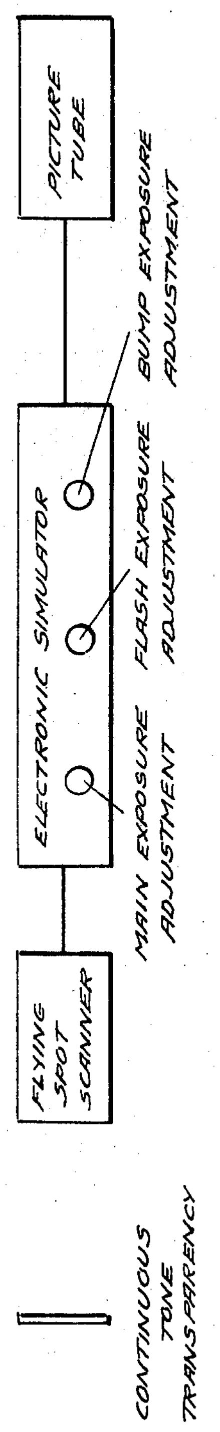
FIG. 5 is a block diagram with legends showing a system for producing exposure values to be used in making a corrected black and white halftone from a continuous tone separation transparency wherein the system has an electronic simulator having a main exposure adjustment, a flash exposure adjustment, and a bump exposure adjustment.
Figure 6:
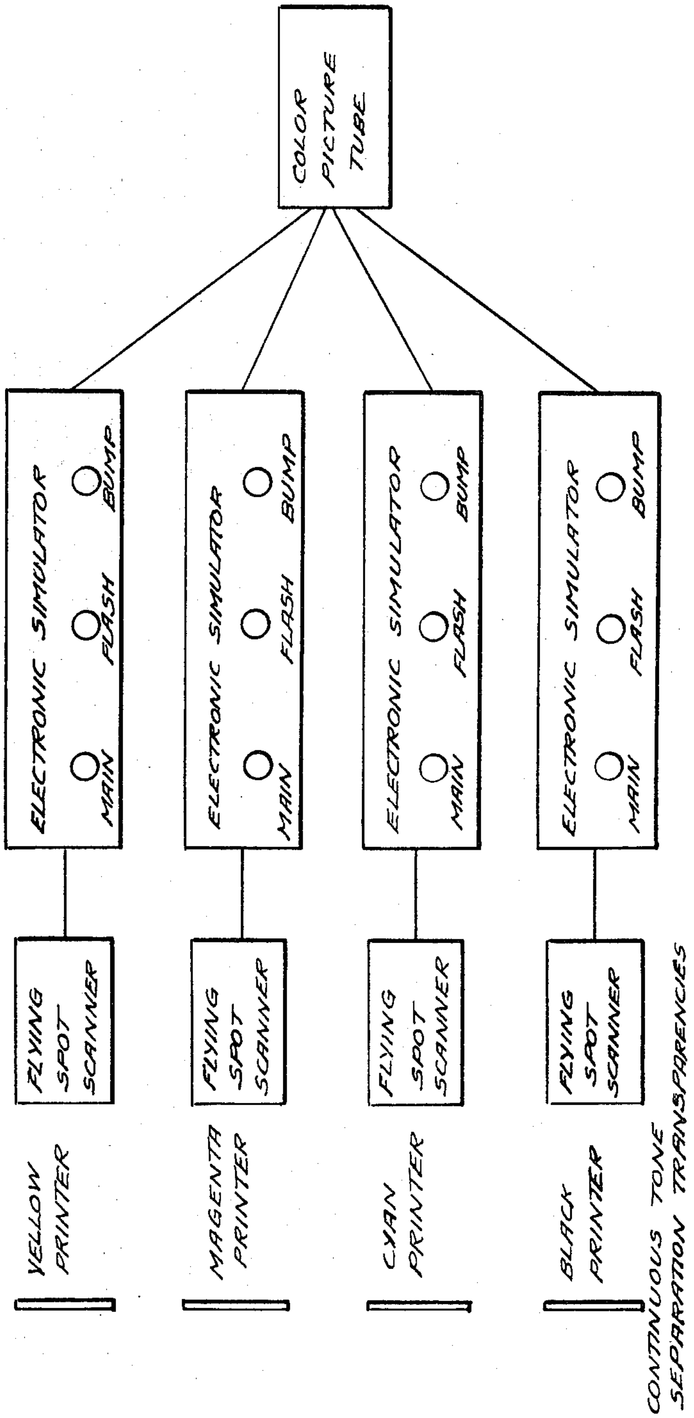
FIG. 6 is a block diagram with legends showing a system for producing exposure values to be used in making a corrected color halftone from three continuous tone separation transparencies, e.g., yellow, cyan, and magenta printer transparencies, and a black printer transparency wherein the system has an electronic simulator for each transparency and each electronic simulator has a main exposure adjustment, a flash exposure adjustment, and a bump exposure adjustment.

FIG. 4 shows a segment of the electronic simulation systems of FIGS. 1, 2 and 3 with the inclusion of a flare exposure simulation module for flare exposure light which is inherently produced in the camera. This flare exposure light is non-image light caused by light reflected from the side walls of the camera and light diffused by the lens of the camera. It has been found to be a function of the light transmission of the continuous tone separation transparency with variables being the camera itself and the optical characteristics of the lens. The flare exposure, since it is a non-image exposure, provides the same function as the flash exposure in the halftone process. The transmission signal $T_x$ is integrated in transmission signal integrator 36. The function of the transmission signal integrator is to measure the light transmission over incremental areas of the continuous tone transparency and integrate over the total area thereby obtaining an averaged transmission signal. The averaged transmission signal is amplified to simulate the effect of the type of camera and its lens. In FIG. 4, amplification is accomplished by attenuating the averaged transmission signal in camera calibration voltage divider 38 which relates the non-image flare exposure light to characteristics of the particular camera used followed by attenuation by camera adjustment voltage divider 40 which simulates the combined effect of the camera and lens. Prior photographic standardization of the camera calibration and camera adjustment voltage dividers is conducted to determine the range of adjustment for the particular camera and lens combination. The output signal from the camera adjustment voltage divider is summed with the non-image flash signal emitted from the flash exposure adjustment voltage divider 18 by flare-flash summation amplifier 42.

An operator using the method and system of this invention can quickly determine the exposure conditions for the main, flash, and bump exposures required to produce tone corrected halftones from a continuous tone transparency by adjusting the adjustment voltage dividers 12, 18, and 30. In color work, the color separation transparencies and black printer transparency are separately scanned and amplified by the electronic simulation system, and then the signals from each electronic simulation system are displayed in one picture tube to enable the operator to quickly determine the exposure conditions for each transparency to produce tone-corrected halftones without relying upon his artistic talents and without requiring proofing of the halftone film.

While there has been described what is at present to be a preferred embodiment of the invention, it will be obvious to one skilled in the art that various changes and modifications may be made therein without departing from the invention.

What is claimed is:

1. A system for electronic simulation of a screening procedure having a main exposure step and flash exposure step to make a halftone on a photographic film from a continuous tone separation transparency and having an input signal proportional to the light transmission of a continuous tone separation transparency and an input signal proportional to the intensity of flash exposure light comprising:
   a. a transmission signal modifying means having an input of the transmission signal to produce a signal representative of main and flash exposures on the photographic film;
   b. an operational summation amplifier in the modifying means to sum the transmission signal with a flash signal representative of flash exposure; and
   c. a screen-film non-linear amplifier which is responsive to the signal of the transmission signal modifying means to produce a signal proportional to the percent dot area of the main and flash exposures.

2. A system of claim 1 wherein the transmission signal modifying means is comprised of a transmission signal attenuation means having as an input the transmission signal to produce a signal proportional to the main exposure on the photographic film and a logarithmic amplifier which is responsive to the signal from the attenuating means; wherein the operational summation amplifier sums the attenuated transmission signal and flash signal to produce a signal which is processed by the logarithmic amplifier.

3. A system of claim 2 wherein the transmission signal attenuating means is comprised of a main exposure calibration voltage divider which has the transmission signal as an input signal, and a main exposure adjustment voltage divider which is responsive to the signal from the main exposure calibration voltage divider to produce a signal which simulates exposure time of the main exposure and wherein the flash attenuating means is comprised of a flash exposure calibration voltage divider which has the flash signal as an input signal, and a flash exposure adjustment voltage divider which is responsive to the signal from the flash exposure calibration voltage divider to produce a signal which simulates exposure time of the flash exposure.

4. A system of claim 2 wherein a bump exposure proportional offset having a constant voltage input signal is responsive to the signal of the logarithmic amplifier to limit an output signal to a value greater than a threshold level established by the constant voltage; a bump exposure attenuating means which is responsive to the signal from the proportional offset produces a signal proportional to the increase in percent dot area resulting from the bump exposure; and a dot summation amplifier which is responsive to the signal from the bump exposure attenuating means and the signal from the screen-film non-linear amplifier which produces a signal approximately proportional to the percent dot area of the main, flash and bump exposures.

5. A system of claim 4 wherein the bump exposure attenuating means is comprised of a bump exposure calibration voltage divider which is responsive to the signal from the proportional offset and a bump exposure adjustment voltage divider which is responsive to the signal from the bump exposure calibration voltage divider to produce a signal which simulates the bump exposure.

6. A system of claim 1 wherein a bump exposure non-linear amplifier which is responsive to the signal from the transmission signal amplifying means produces a signal approximately proportional to the increase in percent dot area resulting from the bump exposure.

7. A system of claim 1 wherein a transmission signal integrator has the transmission signal, as an input, and produces a signal proportional to the average light transmission of the continuous tone transparency; a flare exposure amplifying means which is responsive to the signal from the transmission signal integrator for producing a signal proportional to the flare exposure of the photographic film; and a flare-flash summation amplifier which is responsive to the signal from the flare exposure amplifying means and the signal from the flash amplifying means for producing a flash signal proportional to the flare and flash exposures of a photographic film which is processed as the amplified flash signal to produce a signal proportional to the percent dot area resulting from main, flash, and flare exposure.

8. A system of claim 7 wherein the flare signal amplifying means is comprised of flare signal attenuating means.

9. A system of claim 8 wherein the flare signal attenuating means is comprised of a camera calibration voltage divider which is responsive to the signal from the transmission signal integrator to produce the signal proportional to the flare exposure.

10. A system for electronic simulation of a screening procedure having main, flash and bump exposure steps to make halftones on a photographic film from continuous tone separation transparencies and having an input signal proportional to the light transmission of a continuous tone separation transparency and an input signal proportional to the intensity of flash exposure light comprising:

a. a transmission signal modifying means having an input of the transmission signal to produce a signal representative of main and flash exposures on the photographic film;
b. an operational summation amplifier in the modifying means to sum the transmission signal with a flash signal representative of flash exposure;
c. a screen-film non-linear amplifier which is responsive to the signal of the transmission signal modifying means to produce a signal proportional to the percent dot area of the main and flash exposures;
d. a bump signal non-linear amplifier having as an input a signal proportional to the transmission signal to produce a signal proportional to the increase in percent dot area resulting from the bump exposure; and
e. a dot summation amplifier which is responsive to the signal from the bump exposure non-linear amplifier and the signal from the screen-film non-linear amplifier to produce a signal proportional to the percent dot area resulting from the main, flash, and bump exposures.

11. A system of claim 10 wherein

A. the transmission signal modifying means is comprised of
1. a transmission signal attenuating means which is responsive to the transmission signal to produce a signal proportional to the main exposure on the photographic film, and
2. a logarithmic amplifier which is responsive to the signal from the attenuating means to produce a signal representative of the main and flash exposures; and B. the bump signal non-linear amplifying means is comprised of
1. a bump exposure logarithmic amplifier which is responsive to the signal from the transmission signal attenuating means to produce a signal representative of the main exposure,
2. a dot growth non-linear amplifier which is responsive to the signal from the bump exposure logarithmic amplifier to produce a signal representative of the increase in percent dot area resulting from the bump exposure, and
3. a bump signal attenuating means which is responsive to the signal from the dot growth non-linear amplifier to produce a signal proportional to the increase in percent dot area resulting from the bump exposure.

12. A system of claim 11 wherein the bump signal attenuating means is comprised of a bump exposure calibration voltage divider which is responsive to the signal from the dot growth non-linear amplifier and a bump exposure adjustment voltage divider which is responsive to the signal from the bump exposure calibration voltage divider to produce a signal proportional to the increase in percent dot area resulting from the bump exposure which is corrected for exposure time of the bump exposure.

13. A system for electronic simulation of a screening procedure having a main exposure step to make a halftone from a continuous tone transparency and having an input signal proportional to the light transmission of a continuous tone transparency comprising:

a. a transmission signal modifying means having an input of the transmission signal to produce a signal representative of the main exposure on a photographic film;
b. a screen-film non-linear amplifier which is responsive to the signal of the transmission signal amplifying means to produce a signal proportional to the percent dot area of the main exposure.

14. A method for producing a tone-corrected halftone from a continuous tone separation transparency comprising the steps:

a. producing a transmission signal which is proportional to the light transmission of a continuous tone separation transparency;
b. modifying the transmission signal by an electronic simulation means to produce a signal proportional to the per cent dot area of the halftone in the electronic simulation means having an adjustment means calibrated to main exposure conditions;
c. displaying the percent dot area signal on a picture tube;
d. adjusting the electronic simulation means to produce a display simulating a tone-corrected halftone to obtain camera exposure conditions from the calibrated adjustment means;
e. transposing the exposure conditions to a halftone camera; and
f. producing a tone-corrected halftone on a photographic film.

15. A method for producing tone-corrected halftones for color printing from continuous tone separation transparencies comprising the steps;

a. producing a transmission signal for each continuous tone separation transparency which is proportional to the light transmission of the transparency;
b. modifying each transmission signal by an electronic simulation means to produce a signal proportional to the percent dot area of a halftone made from each separation transparency, the electronic simulation means having an adjustment means calibrated to main exposure conditions;
c. displaying the combined percent dot area signals of all the transparencies on a color picture tube; and
d. adjusting the electronic simulation means for each transparency to produce a display simulating a tone-corrected halftone to obtain camera exposure conditions for each transparency.

16. A method for simulating a halftone of a continuous tone separation transparency comprising a. producing a transmission signal which is proportional to light transmission through a continuous tone separation transparency;

b. modifying the transmission signal by an electronic simulation means to produce a signal proportional to the percent dot area of a halftone of said continuous tone separation transparency, the electronic simulation means having an adjustment means calibrated to exposure conditions;
c. displaying the percent dot area signal on a picture tube; and
d. adjusting the electronic simulation means to produce a display simulating a tone-corrected halftone to obtain camera exposure conditions.

17. A method according to claim 16, wherein modifying the transmission signal comprises
a. attenuating the transmission signal to produce a signal representative of the effect of imagewise exposure of a photographic film through said continuous tone separation transparency, and
b. non-linearly amplifying the attenuated transmission signal to produce a signal proportional to the percent dot area of the halftone of said continuous tone separation transparency.

18. A method according to claim 17 wherein the signal representative of the effect of imagewise exposure is produced by logarithmically amplifying the attenuated transmission signal prior to non-linear amplification.

19. A method according to claim 16 wherein the electronic simulation means has an adjustment means calibrated to main exposure conditions and a separate adjustment means calibrated to the flash exposure conditions, and a flash signal representative of the effect of flash exposure of a photographic film is summed with said transmission signal in said electronic simulation means whereby a percent dot area signal proportional to percent dot area resulting from both main and flash exposures is produced.

20. A method according to claim 19, wherein the per cent dot area signal is produced in the electronic simulation means by
a. attenuating the transmission signal to produce a signal representative of the effect of main exposure of a photographic film through said continuous tone transparency;
b. attenuating a fixed voltage to produce a flash signal representative of the effect of flash exposure on a photographic film,
c. summing the flash signal and attenuated transmission signal, and
d. non-linearly amplifying the summed signals to produce a percent dot area signal proportional to percent dot area resulting from both main and flash exposures.

21. A method according to claim 19 wherein flare exposure is simulated by
a. integrating the transmission signal to produce an averaged transmission signal;
b. attenuating the averaged transmission signal to produce a signal representative of flare exposure on the photographic film; and
c. summing the signal representative of flare exposure with the flash signal and the attenuated transmission signal whereby a signal representative of main, flash and flare exposures is produced.

22. A method according to claim 19, wherein the electronic simulation means has a separate adjustment means calibrated to bump exposure conditions, and wherein a bump signal approximately proportional to percent dot area resulting from bump exposure is summed with the signal proportional to percent dot area resulting from main and flash exposures, whereby a percent dot area signal proportional to percent dot area resulting from main, flash, and bump exposures is produced.

23. A method according to claim 22, wherein the bump signal is produced by non-linear amplification of the transmission signal followed by attenuation of the resulting signal with the adjustment means calibrated to bump exposure conditions.

24. A method according to claim 22, wherein the bump signal is produced by passing the summed transmission and flash signals through an offset thereby producing an offset signal over a threshold level, followed by attenuation of the resulting signal with the adjustment means calibrated to bump exposure conditions.

* * * * *